April 2, 1929.  S. D. FRANKO  1,707,605
HAT CLEANING AND REMODELING MACHINE
Filed April 14, 1925  5 Sheets-Sheet 4
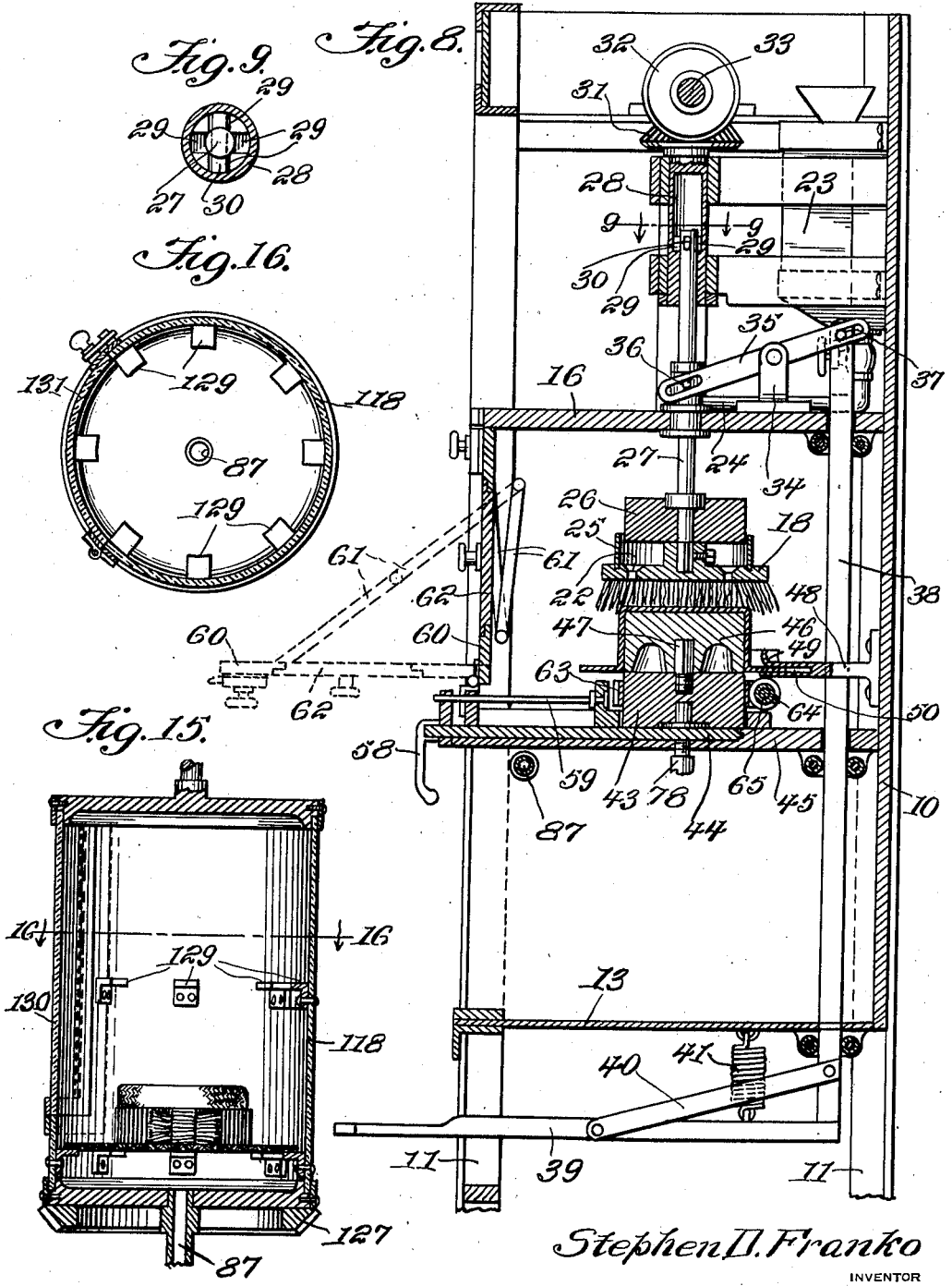

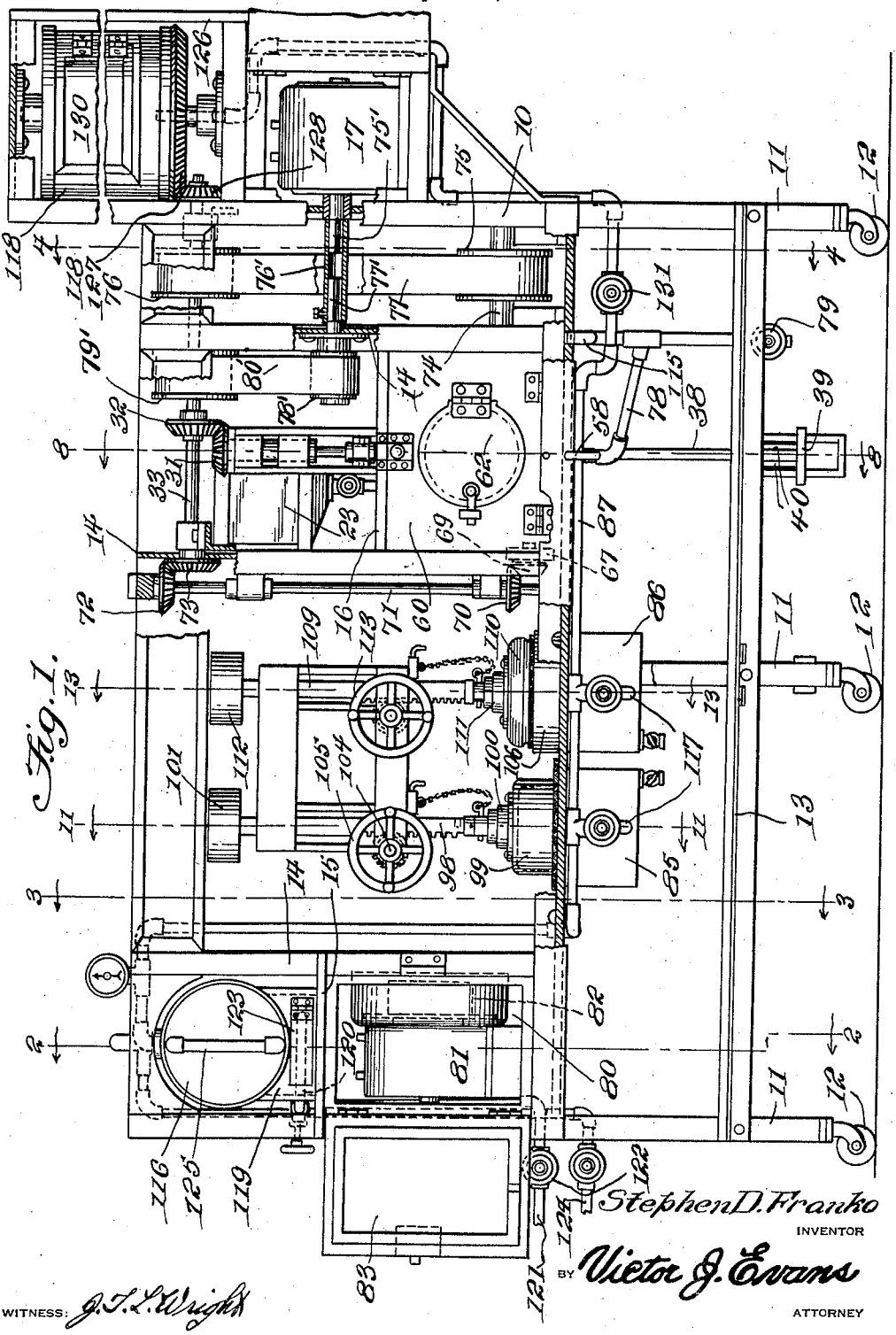

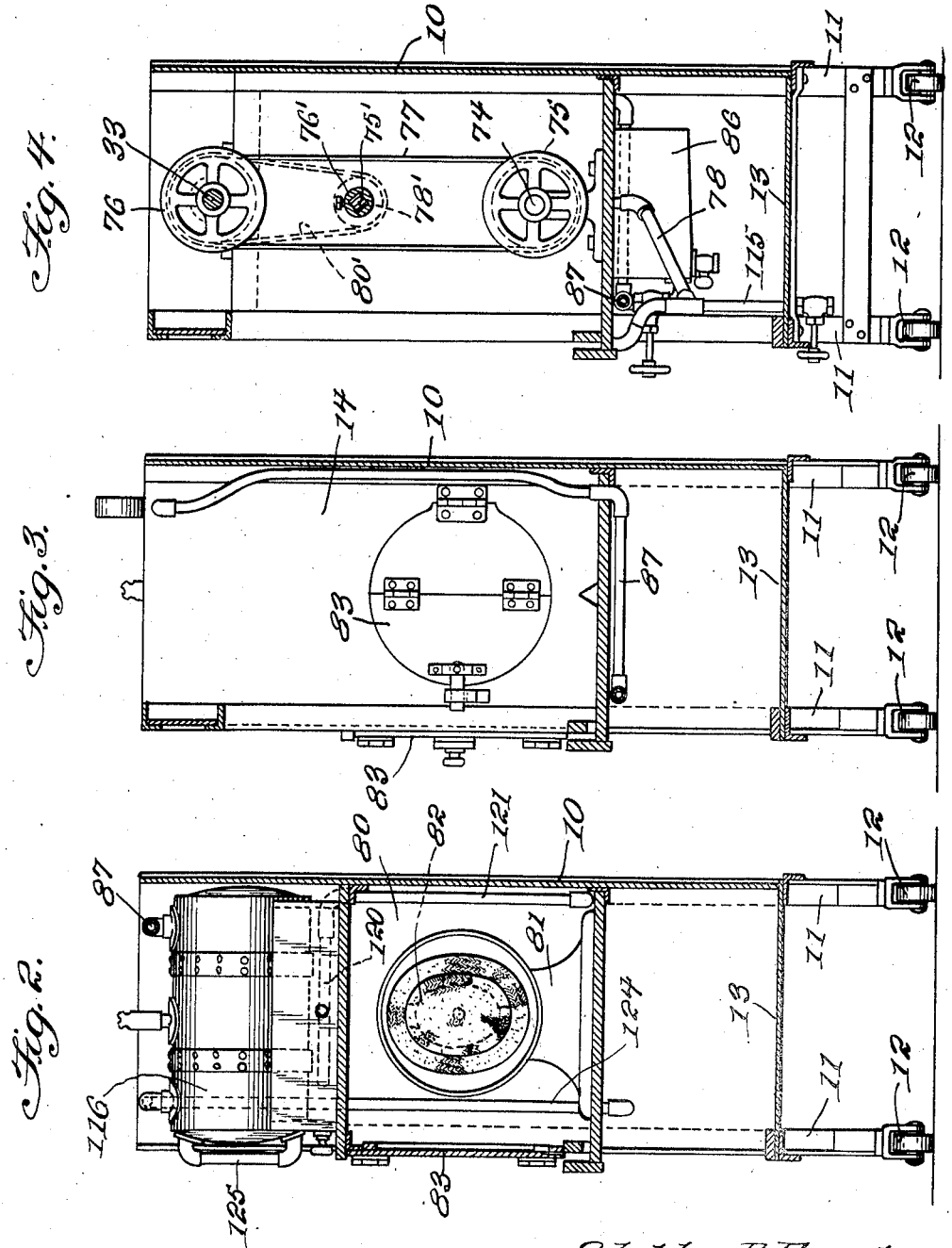

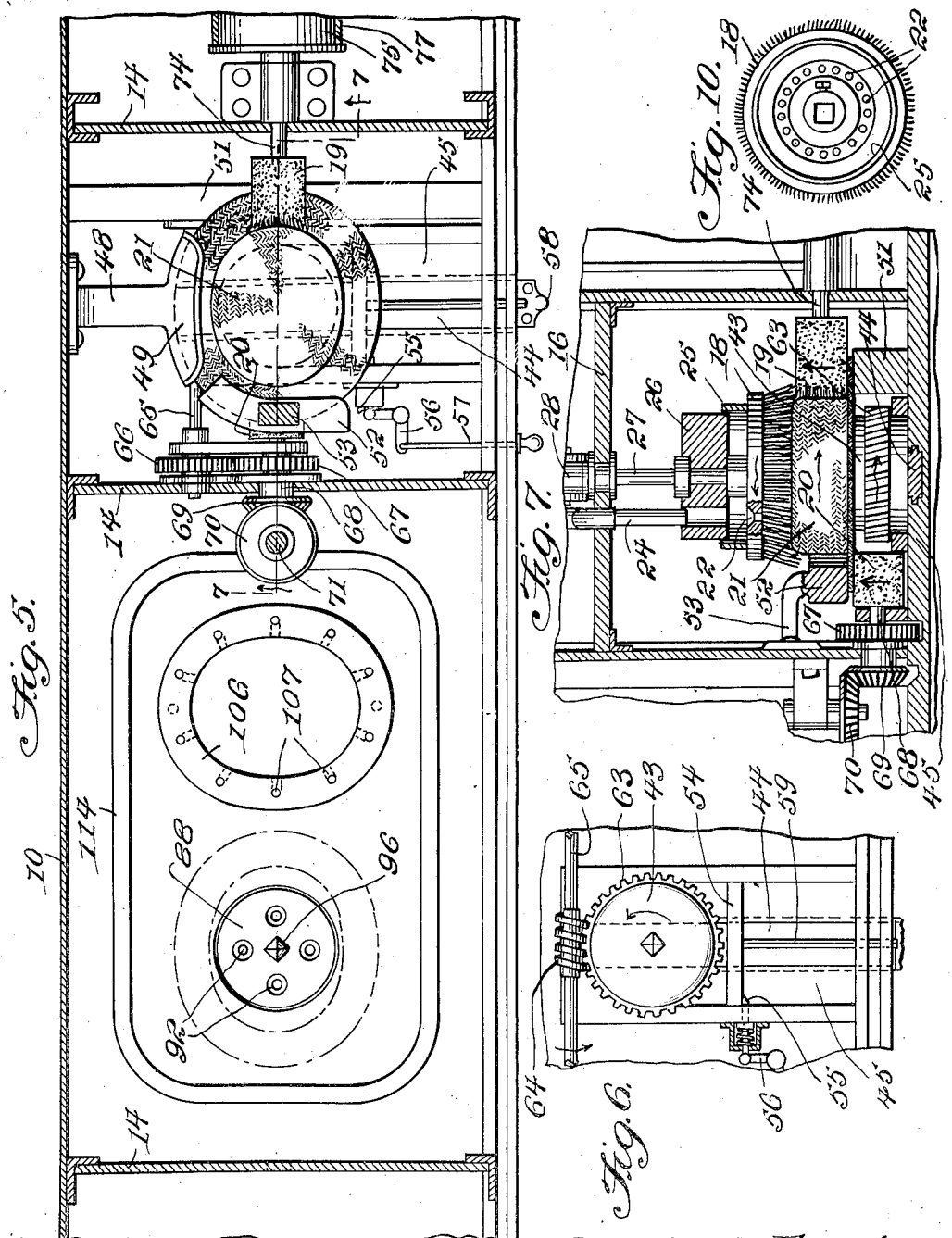

April 2, 1929.   S. D. FRANKO   1,707,605
HAT CLEANING AND REMODELING MACHINE
Filed April 14, 1925   5 Sheets-Sheet 5
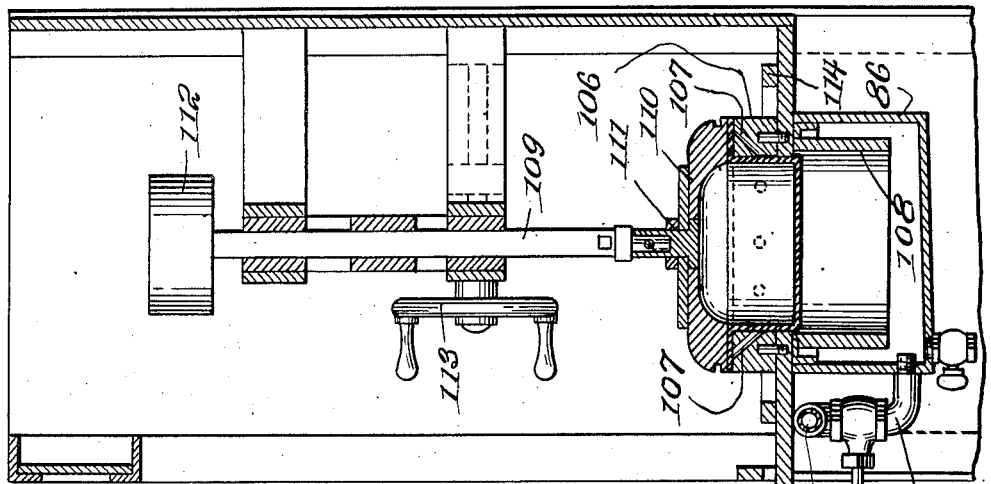
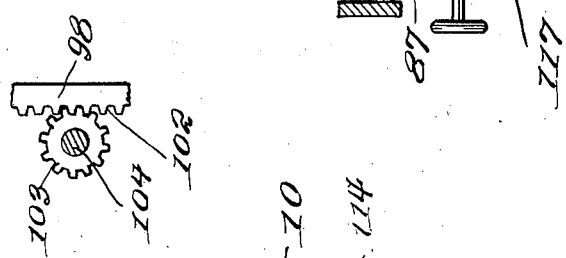
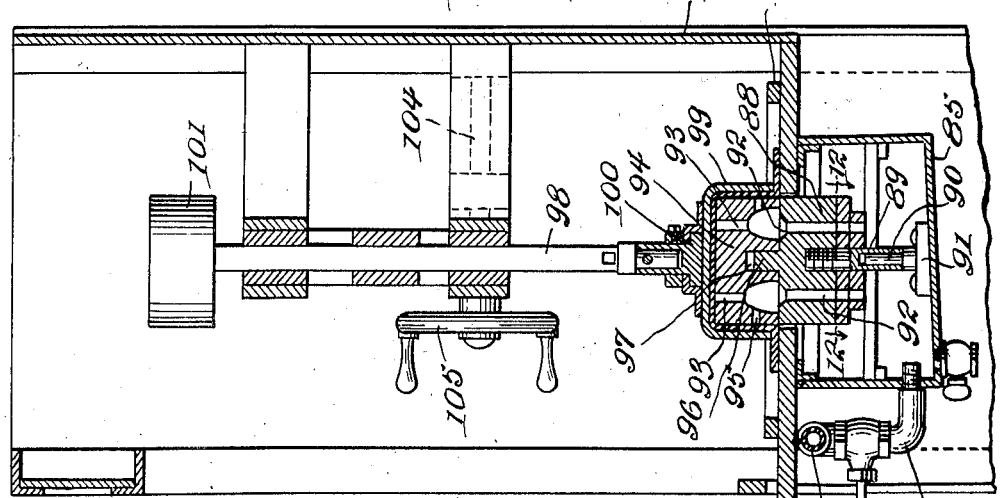
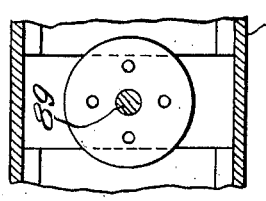
Stephen D. Franko
INVENTOR
BY Victor J. Evans
ATTORNEY
WITNESS: J. T. L. Wright Patented Apr. 2, 1929.

1,707,605

UNITED STATES PATENT OFFICE.

STEPHEN D. FRANKO, OF HAVRE DE GRACE, MARYLAND.

HAT CLEANING AND REMODELING MACHINE.

Application filed April 14, 1925. Serial No. 23,122.

This invention has for its object the provision of a machine designed to thoroughly and expeditiously clean and remodel hats of any character, the invention residing in the construction, combination and arrangement of parts as claimed.

In the drawings forming part of this application like numerals of reference indicate similar parts in the several views, and wherein:

Figure 1 is a front elevation partly in section.

Figure 2 is a sectional view on line 2—2 of Figure 1.

Figure 3 is a sectional view on line 3—3 of Figure 1.

Figure 4 is a sectional view on line 4—4 of Figure 1.

Figure 5 is a fragmentary horizontal longitudinal sectional view.

Figure 6 is a fragmentary view showing the driving connection, for one of the brushes.

Figure 7 is a sectional view on line 7—7 of Figure 5.

Figure 8 is a sectional view on line 8—8 of Figure 1.

Figure 9 is a sectional view on line 9—9 of Figure 8.

Figure 10 is a top plan view of one of the brushes.

Figure 11 is a sectional view on line 11—11 of Figure 1.

Figure 12 is a sectional view on line 12—12 of Figure 11.

Figure 13 is a sectional view on line 13—13 of Figure 1.

Figure 14 is a detail view of the rack and pinion used for elevating and lowering the hat shape or remodeling block.

Figure 15 is a vertical sectional view through the hat receiving and display receptacle.

Figure 16 is a sectional view on line 16—16 of Figure 15.

The machine forming the subject matter of the present invention embodies a cabinet 10 which is adapted to be supported by suitable legs 11, the latter being equipped with rollers 12 so that the cabinet may be conveniently moved from place to place. These legs may vary in number depending upon the size of the cabinet, while supported by all of said legs is a shelf 13 spaced an appreciable distance beneath the bottom of the cabinet 10, and upon which shelf hats are adapted to be supported either before or after they have been cleaned and remodeled. The cabinet 10 is divided by a plurality of vertically disposed partitions 14 into separate compartments, and some of these compartments are subdivided by horizontally disposed partitions 15 and 16 respectively.

Arranged in one of the compartments at one end of the cabinet is a mechanism employed for cleaning the hats, and which mechanism includes a plurality of rotary brushes, all of which are simultaneously operated from a suitable motor 17 mounted at one end of the casing. The brushes above referred to are more clearly illustrated in Figure 7, wherein it will be noted that three brushes are preferably used, and indicated at 18, 19 and 20. The brush 18 is arranged to repose upon the top of the hat, the brush 19 arranged to engage the crown of the hat, while the brush 20 is arranged to clean the underside of the rim of the hat when the latter is arranged between the brushes in the manner shown in Figure 7. It might here be stated that the hat indicated generally at 21 is adapted to be supported for rotation, and is rotated in a direction opposite the direction of rotation of all of said brushes, so that the hat is thoroughly and expeditiously cleaned. The brush 18 is provided with a circumferential series of openings 22 through which a suitable cleaning agent is allowed to pass onto the bristles of the brush, the said cleaning agent being contained in a suitable tank 23 and conveyed onto the top of the brush 18 to a supply pipe 24. This brush is provided with an annular rim 25 which rises from the brush to prevent the cleaning agent from being thrown off the top of the brush by centrifugal force while the said brush is in use. In other words, the rim 25 defines a chamber or compartment into which the cleaning agent is introduced from the pipe 24 and this chamber is closed by a weight 26 supported on the shaft 27 and carrying at its lower end the brush 18. The weight 26 is of course used to hold the brush 18 under pressure in effective contact with the hat while the latter is being cleaned. This brush 18 is susceptible of being raised and lowered, so that it may be put in an out of the way position when necessary to either place a hat in a position to be cleaned, or remove the hat from said position after being cleaned. For this purpose, the shaft 27 is mounted to slide within a sleeve 28, which sleeve is formed with grooves or recesses 29 to receive a cross pin 30 carried by the shaft 27, when the latter is lowered to position the brush 18 against the hat. In other words, the sleeve 28 and the cross pin 30 provide a clutch, whereby rotation is imparted to the shaft 27 from the sleeve 28 when the shaft is in its lowermost position. Manifestly, when the shaft 27 is raised or elevated within the sleeve, the cross pin 30 is separated from the notches or grooves 29, so that the sleeve 28 may continue to rotate without affecting the shaft 27. The sleeve 28 is provided with a bevelled gear 31 which meshes with a similar gear 32 carried by a shaft 33, this shaft being rotated by the motor 17 in a manner to be hereinafter described. Rising from the transverse partition 16 is a bracket or standard 34 upon which is pivoted a lever 35, one end of which has a slot and pin connection 36 with the said shaft 27, while the other end of the lever has a similar connection 37 with a vertically disposed reciprocatory bar 38. This bar is arranged in close proximity to the rear wall of the casing 10 and supports at its lower end a foot engaging member 39 which is suitably supported by a diagonally disposed bracing element 40. The bar 30 slides through an opening in the shelf 13 hereinabove referred to, and connected to the underside of this shelf is a coiled spring 41, the other end of which is connected with the foot engaging member 39 functioning to normally hold the parts in the position shown in Figure 8. When it is desired to raise the brush 18 to an out of the way position it is only necessary to depress the foot engaging element 39 to lower the bar 38, the bar rocking the lever 35 upon its pivot, thereby raising the shaft 27 together with its associated parts.

As hereinabove stated, the hat 21 is adapted to be arranged between the groups of brushes as shown in Figure 7, and for this purpose, I provide a hat support consisting of a block 43 which is mounted upon a slide 44 which has a tongue and groove connection with its support 45. Adapted to repose upon the block 43 which is fixed to the slide 44 is a block 46, the latter having a central opening or bore adapted to receive a pin 47 rising from the block 43. It is upon the block 46 that the head 21 is adapted to be arranged, so that any one of a number of different sized and shaped blocks 46 can be arranged upon the block 43 to accommodate the particular hat to be cleaned. Projecting from the rear wall of the cabinet 10 is a bracket arm 48 which supports an arcuate shaped member 49 at its free end the member being slotted as at 50 to receive a portion of the brim of the hat. When the hat is placed upon the block 46, and a portion of its brim placed within the slot 50, another portion of the brim reposes upon the curved or arcuate shaped block 51 arranged directly beneath the brush 19, so that this portion of the brim is positioned between the brush 19 and the said block 51. Another similarly curved block 52 is supported by a suitable bracket 53 and arranged to repose upon a portion of the brim as clearly shown in Figure 7, the relation of the blocks 51 and 52 with respect to each other and the brim of the hat being such that the shape or configuration of the brim is preserved during the cleaning of the hat. To facilitate placing the hat between the brushes, above described, I make use of the slide 44, which allows the block 43 to be moved adjacent the front of the cabinet so that the block 46 with the hat arranged thereon can be quickly placed upon the block 46, after which the slide 44 is pushed inwardly. An adjustment of the slide 44 takes place while the brush 18 is in its elevated position as above described, the brush 18 being subsequently lowered for use. The slide 44 is provided with a cross piece 54 which is adapted to be engaged by a spring pressed pawl 55 when the slide is in its normal position, thus holding the slide against casual movement during the rotation of the brushes. This pawl 55 is connected with a bell crank lever 56, one branch of which is connected with a manually operable rod 57 which projects through the side of the cabinet, so that by pulling upon the rod 57, the pawl is retracted to allow the slide to be thrown outwardly as will be readily understood. The slide is provided with a handle 58 and also operated on suitable guides 59. The cabinet is provided with a door 60 which is adapted to be swung outwardly and downwardly to a horizontally open position being suitably braced by the pivoted links 61, so that access may be readily had to the cleaning mechanism as the occasion may require. It will be noted that the door 60 is provided with a large central opening which is normally closed by an auxiliary door 62 which can be removed from said opening when it is desired to make use of the main door 60 as a work bench or shelf. In other words, after the door 60 has been lowered to a horizontal position as shown in Figure 8, the hat can be removed from between the brushes and arranged upon this door for further treatment. If it is desired to work upon the hat in an inverted position, the auxiliary door 62 can be removed, thus allowing the crown of the hat to be placed in the opening uncovered by the removal of the door 62.

As hereinabove pointed out, the brushes 18, 19 and 20 respectively are simultaneously rotated in a direction opposite to the direction of rotation of the hat, and for which purpose the block 43 while mounted on the slide for movement therewith is also supported for rotation. This block is provided with a gear 63 which meshes with the worm gear 64 on a shaft 65. This shaft being provided with a gear 66 which meshes with a similar gear 67 carried by a stub shaft 68 which is provided with a bevelled gear 69. This gear 69 meshes with a similar gear 70 supported by the lower end of the vertical shaft 71, the upper end of which is provided with a bevelled gear 72 which meshes with a similar gear 73 carried by the shaft 33. Consequently rotation of the hat supporting block 43 is imparted from the same shaft 33 that rotates the brush 18 above referred to. The shaft 68 rotates the brush 20, while the brush 19 is rotated by the shaft 74. This shaft is provided with a belt pulley 75 over which and a similar pulley 76 mounted upon the shaft 33 is trained an endless belt 77. It will be noted upon inspection of Figure 1 that I provide a drain pipe 78 which depends from the compartment in which the hat cleaning mechanism is arranged so that any liquid that finds its way to the bottom of the compartment is drained off through the pipe 78, the latter being provided with a suitable valve 79. The motor 17 includes a shaft 75′ which is received by a sleeve 76′ as shown in Figure 1. The other end of this sleeve receives a similar shaft 77′ which supports a belt pulley 78′. This pulley is arranged directly beneath a similar but larger pulley 79′ carried by the main shaft 33, an endless belt 80′ being trained over the last mentioned pulleys, whereby motion is imparted to the shaft 33 from the motor 17.

After the hat has been cleaned in the manner above described, it is removed from the particular compartment and placed in what I term a drying compartment 80. In this compartment is arranged an electric motor 81, the shaft of which has mounted thereon a hat support or holder 82. The hat is arranged upon this holder and the motor 81 put into operation, whereupon the hat is rotated at a very high rate of speed with a view of removing the moisture from the hat and substantially drying it in comparatively quick order. This compartment 80 is provided with doors 83 so that access may be readily had to the compartment as the occasion may require. The hat is then removed from this compartment 82 and is arranged in another compartment in which the hat is remodeled.

Arranged beneath the bottom of the cabinet, and directly beneath one of the compartments are spaced steam receiving chambers 85 and 86 respectively, each of which has valve controlled communication with a steam supply pipe 87. Arranged in the chamber 85 is a block 88 which is mounted for rotation, being provided with a depending sleeve like member 89 receiving a pin 90 rising from the base 91, and upon which the block 88 is supported for rotation. This block 88 is provided with steam passages or bores 92 which communicate with similar bores 93 in the block 94 adapted to repose upon the block 88, and upon which block 92 the hat being dealt with is adapted to be arranged. This block 94 is also provided with laterally disposed steam passages 95, so that the steam from the chamber 85 is directed against all portions of the hat through the various passages. The block 94 is associated with the block 88 for movement therewith through the instrumentality of a square pin 96 rising from the block 88 and entering a recess 97 in the block 94. Suspended from a shaft 98 is a hat mold 99 for shaping or remodeling the hat, and this mold is swivelly connected with the lower end of the shaft as at 100, so that the mold can be conveniently turned or rotated to properly position the same with relation to the hat. This mold is held under pressure against the hat, for which purpose the shaft 98 is provided with a suitable weight 101. The shaft 98 together with the mold can be raised or lowered with relation to the block 94 for which purpose, the shaft 98 is provided with rack teeth 102 which mesh with a pinion 103 carried on a suitable shaft 104. This shaft is journalled in a suitable bracket and is rotated through the instrumentality of a hand wheel 105.

Arranged in the same compartment but directly above the steam chamber 86 is a ring or annulus 106, which supports the hat in an inverted position, the crown being received by said annulus and the rim reposing upon the upper surface thereof. This is used for pressing the rim while the hat is being remodeled or shaped, the ring 86 being provided with a circumferential series of diagonally disposed bores 107 which direct the steam from the chamber 86 to the underside of the rim reposing upon the upper surface thereof. Disposed with the chamber 86 is an annular wall 108 arranged to direct the steam upwardly through the ring and against the crown of the hat to be received thereby. Supported on the lower end of the shaft 109 is a dome shaped rim engaging member 110 which is adapted to repose upon the rim of the hat for the purpose of pressing the same. This rim engaging member 110 is swivelly connected with the lower end of the shaft as at 111 so that the said member can be conveniently turned or adjusted with relation to the rim of the hat being dealt with. This member is also held against the rim under pressure, the weight 112 being used for this purpose, and supported on the upper end of the shaft 109. The member 110 can be moved toward and away from the ring 106 by a pinion similar to that of 103 shown in Figure 14 and adapted to engage teeth on the shaft 109. The pinion is mounted on the shaft which is rotated by a hand wheel 113. Surrounding each of the devices just described, and reposing upon the bottom of the cabinet is a ring 114 which is arranged to confine the moisture within the cabinet within a limited space, this moisture ultimately finding its way through a drain pipe 115. The steam for the chambers 85 and 86 is conveyed from a boiler 116 arranged in a suitable compartment in the cabinet, the steam supply pipe 87 leading from the boiler and extending along the bottom of the cabinet, and communicating with the respective chambers by means of branches 117. This supply pipe 87 is then continued toward the other end of the cabinet and extended upwardly to enter the receptacle 118 clearly shown in Figure 15, the purpose for which receptacle will be hereinafter described. The boiler 116 reposes upon an annular support 119, and which support receives a burner 120 which is coupled with the adjacent end of a fuel supply pipe 121, the latter being provided with a suitable valve 122. Access to the burner is had by opening the door 123, so that it can be lighted or extinguished when desired. A water supply pipe is indicated at 124 and has valve controlled communication with the boiler, the latter being equipped with a water gauge 125.

The receptacle 118 is arranged at one end of the cabinet as illustrated in Figure 1, and this receptacle is preferably constructed from transparent material, so that hats after being cleaned can be placed within the receptacle for display. The receptacle is mounted for rotation within a suitable bracket 126, and has associated with the lower end thereof a bevelled gear 127 which meshes with a gear 128 carried by the adjacent end of the shaft 33. Projecting inwardly from the wall of the receptacle are spaced superimposed series of brackets 129 arranged to support the hat as shown in Figure 15. The number of hats which can be arranged within the receptacle depends of course upon the size of the receptacle and the number of brackets used. When a hat is especially dirty, it is beneficial to initially subject the hat to a steam bath, before placing it in the cleaning compartment between the respective brushes above described. Therefore the hat can be arranged within the receptacle 118, and the valve 131 in the steam supply pipe opened, to allow steam to pass into the receptacle 118 for the purpose mentioned. The receptacle is provided with a door 130 so that access may be readily had to the receptacle when desired.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. A machine of the character described comprising a cabinet, a vertically extending hat support arranged therein and mounted for rotation, a slide upon which said support is mounted, a plurality of brushes grouped about said support and arranged to engage the brim and crown of the hat, means including a motor driven shaft for rotating said brushes and said hat support simultaneously, means for supplying one of said crown engaging brushes with a cleaning agent, said last named brush having a support extending vertically above the hat support, and means for adjusting the last mentioned brush toward and away from the support to allow the latter to be moved from between said brushes with said slide.

2. In a hat cleaning machine, a rotatable hat supporting block, a grooved rim receiving guide positioned adjacent the support, brushes arranged to engage the crown and rim of a hat mounted upon the support, bearing blocks to resist pressure of the rim engaging brushes, means to raise the crown engaging brush to position or remove the hat, and means to move the hat support toward and away from the grooved rim receiving guide.

3. In a hat cleaning machine, a rotatably mounted hat support, a slide upon which said support is mounted, a grooved rim receiving guide positioned adjacent the support, brushes arranged to engage the crown and rim of a hat mounted upon the support, bearing blocks to resist pressure of the rim engaging brushes, and means to guide the slide toward and away from the grooved rim receiving guide.

4. In a hat cleaning machine, a hat support, a rotatable brush adapted to engage the crown of a hat mounted upon the support, a compartment in the top of the brush to receive a cleansing agent and feed the same to the bristles of the brush, means to supply a cleansing agent to the compartment, and a weight arranged to provide a closure for the compartment and to force the brush into contact with the hat.

In testimony whereof I affix my signature.

STEPHEN D. FRANKO.